UNITED STATES PATENT OFFICE.

JOHANN CARSTENS, OF LEVERKUSEN, GERMANY, ASSIGNOR TO FARBENFABRIKEN VORM. FRIEDR. BAYER & CO., OF ELBERFELD, GERMANY, A CORPORATION OF GERMANY.

PRINTING-PASTES AND PROCESS OF PRODUCING SAME.

1,126,387.     Specification of Letters Patent.     Patented Jan. 26, 1915.

No Drawing.     Application filed November 20, 1912. Serial No. 732,525.

*To all whom it may concern:*

Be it known that I, JOHANN CARSTENS, doctor of philosophy, chemist, citizen of the German Empire, residing at Leverkusen, near Cologne, Germany, have invented new and useful Improvements in Printing-Pastes and Processes of Producing Same, of which the following is a specification.

The printing with vat dyestuffs of the anthraquinone series has been hitherto carried out in such manner that the dye was fixed on the fiber as leuco compound by steaming in the presence of a large quantity of caustic soda lye; the use of caustic soda lye, especially in large quantities suffers however from several disadvantages; *e. g.* the change (mercerization) of the cotton fiber (see Lauber's *Handbuch des Zeugdrucks, Ergänzungsband II*, page 20, etc.; Peters *Färberzeitung* (1911) page 740, etc.)

I have now found that printing pastes can be produced from vat dyestuffs of the anthraquinone series which can be printed without free alkali and that the above mentioned disadvantages can be avoided. This process consists in neutralizing the excess of alkali in the vat prepared with the aid of caustic alkalis with alkali-binding agents of a weak acid character such as sodium bicarbonate, potassium bicarbonate, bisulfite, aluminum acetate, aluminum hydrate, boric acid, organic acids etc. The resulting printing pastes yield as good results and in many cases even better results than can be obtained by the use of a printing paste containing free alkali in which these dyestuffs are much more soluble. This is all the more surprising as earlier attempts to overcome the difficulties arising from the use of free alkali by the use of printing pastes which had been prepared by simply mixing the dyestuff, reducing agent and sodium carbonate with the paste without previous solution have practically proved a failure and as this process can only be used for the production of light shades.

In order to illustrate the invention more fully the following examples are given, the parts being by weight:

Example 1.

150 gr. of algol blue RG (paste)
30 " of glycerin
605 " of thickening (*e. g.* starch tragacanth mucilage)
15 " of hydrosulfite
50 " of soda lye 50° Bé.
    are well stirred together and heated to about 40° C. After the dyestuff is dissolved
70 " of sodium bicarbonate
80 " of rongalite C powder are added.
———
1000 gr.

In using this paste cotton is printed with it, dried, steamed for 5 minutes in the mather platt, chromed in open width with an aqueous bichromate solution containing 10 grams of acetic acid and 3 grams of bichromate per liter of water, rinsed, soaped at the boil for 10 minutes and finished.

Example 2.

150 gr. of algol blue RG (paste)
30 " of glycerin
285 " of thickening
15 " of caustic soda lye (50° Bé.)
20 " of hydrosulfite powder concentrated
    are well stirred together. As soon as the dyestuff is dissolved
20 " of the hydrate of alumina, capable of easy solution well mixed with
284 " of thickening
83 " of water
35 " of potash
18 " of sodium carbonate.
60 " rongalite C powder are added.
———
1000 gr.

In using the resulting paste the goods are printed and finished as above described.

*Example 3.*

```
 150 gr. of algol blue 3R (paste)
  50  "  of soda lye 50° Bé.
  15  "  of hydrosulfite powder concen-
              trated
              are well stirred together; after
              the vat is formed it is added to
              a mixture of
 605  "  of thickening
  30  "  of gylcerin
  70  "  of potassium bicarbonate
  80  "  of rongalite C
────
1000 gr.
```

In using this paste it is printed on silk and the goods finished as described in Example 1.

I claim:—

1. The process of making printing pastes which comprises dissolving vat dyes of the anthraquinone series with the aid of caustic alkali, neutralizing the excess of alkali with an alkali-binding agent of a weak acid character, and adding thickening and reducing agents at some stage of the process.

2. The process of making printing pastes which comprises dissolving vat dyes of the anthraquinone series with the aid of caustic alkali and a reducing agent, neutralizing the excess of alkali with an alkali-binding agent of a weak acid character, and adding thickening agents at some stage of the process.

3. The process of making printing pastes which comprises dissolving vat dyes of the anthraquinone series with the aid of caustic alkali and a reducing agent, neutralizing the excess of alkali with an alkali-binding agent of a weak acid character, and adding thickening agents and a further amount of reducing agent at some stage of the process.

4. The process of making printing pastes which comprises dissolving vat dyes of the anthraquinone series with the aid of caustic alkali and a reducing agent, neutralizing the excess of alkali with an alkali-binding agent of a weak acid character, adding a further amount of reducing agent, and adding thickening agents at some stage of the process.

5. In the art of making printing pastes from vat dyes of the anthraquinone series, the process which comprises neutralizing with an alkali-binding agent of a weak acid character, the free alkali present in a vat prepared with the aid of caustic alkali and a reducing agent.

6. In the art of making printing pastes, from vat dyes of the anthraquinone series, the process which comprises neutralizing with an alkali-bicarbonate, the free alkali present in a vat prepared with the aid of caustic alkali and a reducing agent.

7. The process of making printing pastes which comprises dissolving vat dyes of the anthraquinone series with the aid of caustic alkali, neutralizing the excess of alkali with an alkali-binding agent of a weak acid character, and adding thickening agents and sulfoxylate as reducing agent at some stage of the process.

8. The process of making printing pastes which comprises dissolving vat dyes of the anthraquinone series with the aid of caustic alkali and hydrosulfite, neutralizing the excess of alkali with an alkali-binding agent of a weak acid character, and adding thickening agents at some stage of the process.

9. The process of making printing pastes which comprises dissolving vat dyes of the anthraquinone series with the aid of caustic alkali and hydrosulfite, neutralizing the excess of alkali with an alkali-binding agent of a weak acid character, and adding thickening agents and a further amount of reducing agent at some stage of the process.

10. The process of making printing pastes which comprises dissolving vat dyes of the anthraquinone series with the aid of caustic alkali and hydrosulfite, neutralizing the excess of alkali with an alkali-binding agent of a weak acid character, adding a further amount of reducing agent, and adding thickening agents at some stage of the process.

11. Printing pastes comprising a vat dye of the anthraquinone series in a reduced condition in which paste the free alkali has been neutralized with an alkali-binding agent of a weak acid character, substantially as described.

In testimony whereof I have hereunto set my hand in the presence of two subscribing witnesses.

JOHANN CARSTENS. [L. S.]

Witnesses.
  HELEN NUFER,
  ALBERT NUFER.